United States Patent [19]

Otto et al.

[11] Patent Number: 5,186,826
[45] Date of Patent: Feb. 16, 1993

[54] APPARATUS FOR SEPARATING AT LEAST TWO BIOLOGICAL SUBSTANCES IN SOLUTION BY ADSORPTION

[75] Inventors: Veit Otto, St. Wendel; Wolfram Weber, Spiesen-Elversberg; Iris Müller-Stein, Bexbach-Höchern; Wolfgang Schiebler, Frankfurt am Main, all of Fed. Rep. of Germany

[73] Assignee: Fresenius AG, Fed. Rep. of Germany

[21] Appl. No.: 861,448

[22] Filed: Apr. 1, 1992

[30] Foreign Application Priority Data

Apr. 3, 1991 [DE] Fed. Rep. of Germany ....... 4110730

[51] Int. Cl.⁵ .............................................. B01D 15/08
[52] U.S. Cl. .................. 210/198.2; 210/289; 210/291; 210/656; 55/386
[58] Field of Search ............... 210/189, 198.2, 285, 210/289, 291, 656; 55/386

[56] References Cited

U.S. PATENT DOCUMENTS

| | | | |
|---|---|---|---|
| 197,368 | 11/1877 | Hobson | 210/285 |
| 2,170,180 | 8/1939 | Youker | 210/289 |
| 3,298,791 | 1/1967 | Meyer | 210/189 |
| 4,276,178 | 6/1981 | Gappa | 210/289 |
| 4,554,071 | 11/1985 | Ruijten | 210/198.2 |

OTHER PUBLICATIONS

Ruijten et al., "The Use of Conical Precolumns in Chromatographic Analysis", Trends in Analytical Chemistry, vol. 6, No. 5, pp. 134-138 (1987).

*Primary Examiner*—Ernest G. Therkorn
*Attorney, Agent, or Firm*—Marshall, O'Toole, Gerstein, Murray & Bicknell

[57] ABSTRACT

An improved apparatus (10) is made available for separating at least two biological substances in solution by adsorption and comprises in the upper interior section (28) of its housing (10) a means effecting a partial constriction of the cross-section of said interior section (28), said section thereby being divided into an upper and lower subspace (34; 36), and which is further distinguished in that the upper subspace (34) and the lower subspace (36) are in flow connection with each other both as regards the solution to be separated and the adsorption agent particles, the feed tube (40) for the solution to be separated being arranged in such a manner that the discharge of the solution to be separated takes place in the lower subspace (36), and the apparatus is a self-contained in unit in sterile form.

11 Claims, 1 Drawing Sheet

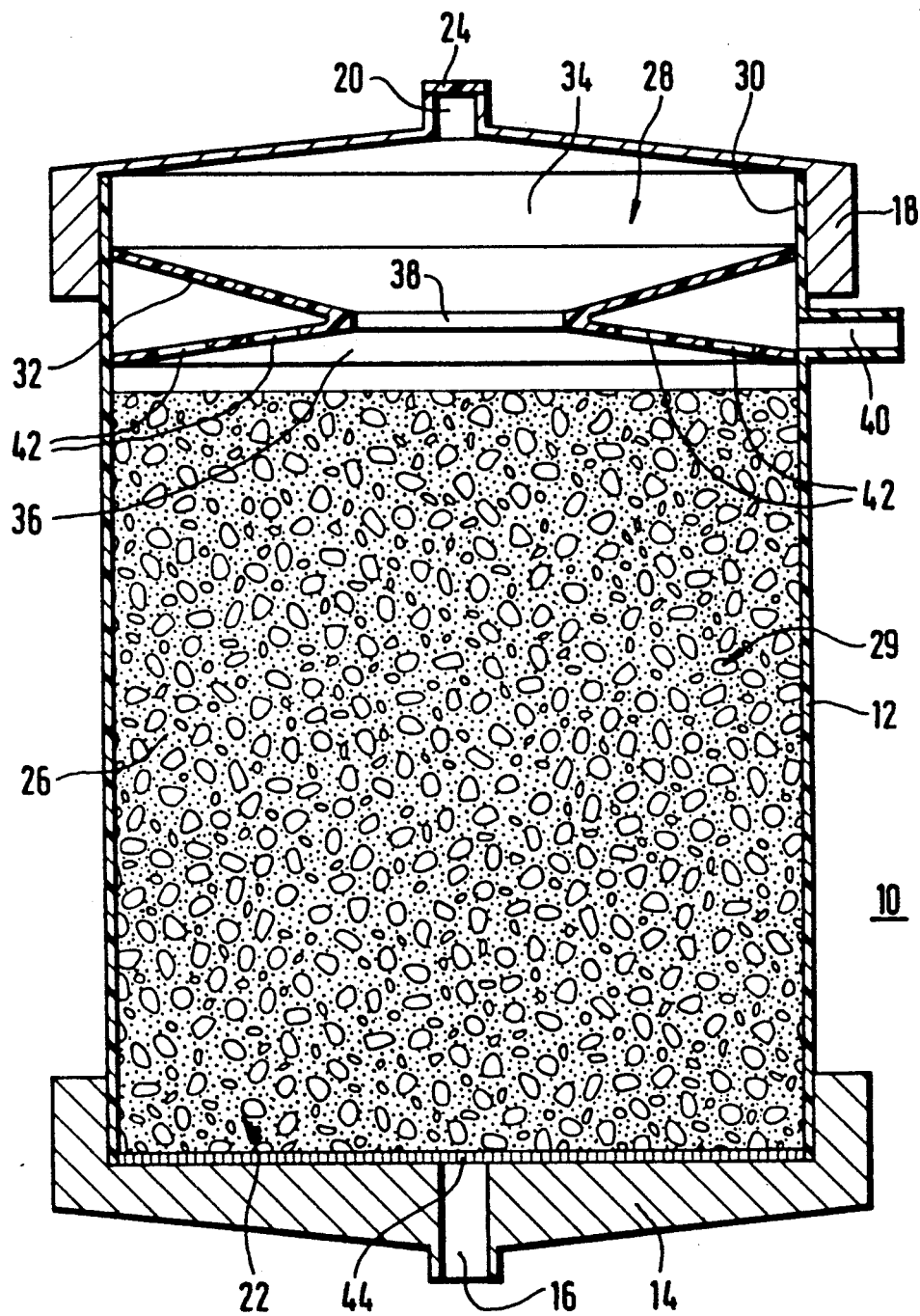

APPARATUS FOR SEPARATING AT LEAST TWO BIOLOGICAL SUBSTANCES IN SOLUTION BY ADSORPTION

The invention relates to an apparatus for separating at least two biological substances in solution.

To achieve good separating powers or high capacities of separating media, such as adsorption agents, a uniform flow through the separating materials is of course necessary. This is achieved by an optimum dense packing of the separating material, a dense packing of the material against the column wall being particularly critical. Due to the different material properties of adsorber housing and separating material, zones can form which have relatively large intermediate spaces, leading to excessive flow velocities in said zones and thus to poor separating powers, the so-called edge effects.

Similar effects occur with inclusions of air bubbles in the separating material. These bubbles lead to capillary formation and irregular flow velocities of the solution to be separated in the separating media. To minimize these defects, the separating agent must (a) be firmly packed and free from air bubbles, (b) the material after its packing must be moved or shaken as little as possible, (c) the flow of the solution to be separated onto the separating medium must be as uniform as possible, and (d) during operation of the apparatus air bubbles must not get into the packed separating medium.

To fulfill the aforementioned requirements, as is known there are fundamentally two possible solutions. In one of them, the apparatus is prepacked and the packed separating material is enclosed by sieves so that it can move as little as possible (as is the case for example with HPLC columns). This method has the following disadvantages: (1) After the packing the column must be handled very carefully in complicated packages to avoid appreciable shaking during transport thereof, (2) Large temperature fluctuations as occur for example in a heat sterilization in autoclaves lead to undesirable expansions and movement of the separating material, (3) Air inclusions resulting from "running dry" of the column are very difficult to remove.

The alternative known method in which in particular the disadvantage referred to under (1) is avoided resides in that in the housing of the apparatus adequate dead volume is present to enable the adsorption agent to be completely shaken up before use and then packed. However, the relatively large dead volume necessary for this purpose results in high local flow velocities during operation of the apparatus and this in turn leads to an irregular flow through the separating medium; moreover, dilution effects are caused which lead to the formation of a concentration gradient within the liquid disposed in the dead volume and this impairs the separating power of the apparatus.

Hitherto, attempts have been made in chromatography to solve this problem in that the solution to be separated is brought after packing of the apparatus by a movable ram into the immediate vicinity of the interface of the column material (so-called column bed). Such a construction has however the following disadvantages: (1) It is too complicated and expensive for the production of dispensable articles as are preferred in medical technology; (2) Although in such an apparatus the interior thereof can be sterilized, the introduction of the ram represents an unsterile component introduced into the sterile interior. As a result, it is not possible to guarantee exclusion of contamination of the column material.

However, such a guarantee is extremely desirable for example for medical technology and for biotechnology. (3) Finally, after the packing of the column air inclusions therein are very difficult to remove.

The present invention is based primarily on the problem of improving an apparatus of the type mentioned at the beginning which is heat-sterilizable as a whole and intended for carrying out the aforementioned second method, i.e. shaking and packing of the column material prior to use of the apparatus, in such a manner that a substantially homogeneous separation of the solution to be treated can be achieved, and this process of packing is to be repeatable several times, for example directly before use of the apparatus, whilst maintaining sterility thereof.

A further objective in operating the apparatus is to avoid the formation of a concentration gradient in the solution disposed above the adsorption agent packing and also to avoid contact of the solution to be separated with air. The occurrence of a concentration gradient in the solution leads as is known to an impairment of the separating power of a column.

This problem is solved by the characterizing features of the invention.

BRIEF DESCRIPTION OF THE DRAWING

The drawing shows a cross-section through the apparatus according to the invention in a preferred embodiment.

DESCRIPTION OF THE PREFERRED EMBODIMENTS

The apparatus 10 according to the invention for separating mixed solutions comprises firstly a housing 12 which is made tubular and preferably has a circular cross-section. In this respect it is advantageously given a cylindrical form.

The lower side of the housing is closed, in the case of the example by a cover 14, from which an outlet 16 extends downwardly. The upper side of the cylindrical housing 12 is sealed by a further cover 18 which advantageously has an opening 20 in the middle through which excess air can be vented off. If the interior 22 of the housing is to be sterile, the opening 20 is provided with a microporous hydrophobic sterile filter.

The housing 12 need not necessarily be sealed with a cover 14 and 18 at both ends. On the contrary, if the housing consists of glass or plastic it may also be drawn out at its lower side to an outlet whilst the upper side is covered by a filter.

The interior 22 of the housing 12 is filled in its lower region with a column material 26 above which the remaining upper interior section 28 extends which is divided by a distributing arrangement 32 extending inwardly from the inner wall 30 into an upper subspace 34 and a lower subspace 36. The two subspaces 34 and 36 are in flow connection with each other through a preferably central opening 38 disposed in the distributing arrangement 32.

The distributing arrangement 32 is in flow connection with the surroundings themselves by means of a feed tube 40 which is preferably laterally arranged and passes through the housing 12.

On the other hand the distributing arrangement comprises at its lower side openings 42 which are in flow connection on the one hand with the feed tube 40 and on the other with the interior section 28. The discharge of the solution to be separated and supplied via the tube 40 is thus into the lower subspace 36.

To prevent the column material 26, usually present in the form of small particles, from being washed out of the housing 12, on the lower side of the container, advantageously on the cover 14 a sieve 42 is provided which has a mesh width which is usually less than the mean particle diameter.

Preferably, the means for partial cross-section constriction of the upper housing section, in particular the hollow annular distributing arrangement 32 shown in the Figure, for the solution to be separated is configured in such a manner that it tapers in cross-section on its upper side or also, as shown in the Figure, on its lower side to its centre, i.e. conically towards the opening 34 disposed centrally in this case.

Such a funnel-like configuration of the means effecting the desired partial cross-section constriction of the upper subspace 34 leads mainly to a perfecting of the packing operation in that as a result a more rapid and/or more complete sedimentation of the particles swirled up during packing in the lower housing section is ensured. The means for partial constriction of the cross-section of the upper subspace 34 may consist of a constriction in the upper subspace 34, a component disposed at the inner side walls thereof, for example in the form of an annular disc, the diameters thereof preferably corresponding to the internal diameter of the interior section 28, or preferably of the hollow annular distributing arrangement 32. This sedimenting process is promoted by as smooth as possible surfaces of the upper and/or lower sides of the constriction, the component and the hollow annular distributing arrangement 32. This ensures that after complete swirling up of the column material the latter easily slips into the lower housing section during packing and thus the upper interior section 28 or its two subspaces 34 and 36 are largely free from column material. In the case of the distributing arrangement 32 there is the additional advantage that such a conical configuration provides a particularly uniform distribution of the solution over the cross-section of the packing.

In the apparatus according to the invention the feed for the solution to be separated is arranged in such a manner that the discharge thereof takes place in the lower subspace 36 which is defined by the location of the constriction of the cross-section of the upper subspace 34 and the boundary face of the packed column material 26.

The preferred central opening 38 illustrated in the drawings makes it possible to shake up the column material in an adequately large dead volume. Due to the large area of the means effecting the constriction however convection and diffusion of the solution to be separated with the supernatant solvent is largely excluded.

The feed tube 40 may however also be mounted axially or one or more feed tubes 40 may for example also be arranged radially; in each case the feed tube or tubes 40 open into the space which is defined by the location of the cross-section constriction of the upper interior section 28 and the boundary surface of the packed column material 26, the feed openings expediently being provided with a sieve 44.

A vertical discharge of the solution be separated into said space is however not very advantageous because with relatively large flow velocities there is a danger of the packed adsorption material being swirled up. With the preferred distributing arrangement 32 however, a vertical flow is largely avoided.

Preferably, during operation of the apparatus 10 the dead space in the upper interior section 28 has a volume which is at least 5% of the lower interior section 29 packed with the column material 26.

This ensures that an adequate dead space, i.e. the space not occupied by the column material packing 26, is available to the adsorption agent shaken up in the packing operation. On the other hand, however, the dead space should be as small as possible.

The opening 20 makes it possible to let air out of the apparatus, said air having been entrained into the column material 26 with the solution or when running the apparatus 10 dry, this being possible even during operation thereof, and also permits the adjustment of a liquid level, this being particularly advantageous in the case of the apparatus 10 running dry. If the air outlet 20 is provided with a sterile filter then it is possible to repack an apparatus which has run dry in the closed system with introduction of a sterile solution without any danger of contamination.

As explained above, the upper interior section 28 is divided into the subspaces 34 and 36 connected together by the preferably central opening 38, preferably by the annular distributing arrangement 32 illustrated in the Figure. In combination with the specific arrangement of the feed for the solution to be separated, which permits a discharge thereof in to the lower subspace 36 which is defined by the boundary face of the packed column material 26 and the location of the constriction in the upper interior section 28, i.e. by a plane passing through the in this case central opening 38, this ensures an improved separation. For during operation of the apparatus 10 a mutual exchange of the solution disposed respectively in the upper subspace 34 and in the lower subspace 36 due to diffusion and convection is thus largely excluded, and thus also the occurrence of a concentration gradient in the solution disposed above the adsorption agent packing 26 in the upper interior section 28, i.e. in the dead space. This is achieved in that due to this specific division and solution path substantially only part of the dead space, that is the lower subspace 36, is traversed by the solution supplied. Avoiding a concentration gradient is very desirable because such dilution effects considerably reduce the power of an apparatus 10 for separating mixed solutions.

In the case of separation of blood this has the advantage that the latter runs into the solvent and thus does not come into contact with air; it is nevertheless not unnecessarily diluted.

Summarizing, the apparatus according to the invention has the following advantages, in particular in its preferred embodiments:

The apparatus 10 forms a self-contained sterile system and if suitable materials are chosen can be heat-sterilized as a whole, for example in an autoclave; due to its relatively simple structure and the absence of any moving parts it is suitable for use with dispensable articles.

The apparatus according to the invention can be repacked immediately before starting operation by complete shaking up of the column material.

It ensures a good distribution of the solution to be separated over the cross section of the adsorption agent packing whilst largely avoiding any turbulence of the latter.

In addition, during its operation it makes it possible to maintain a relatively small dead space for the solution and to largely avoid occurrence of a concentration gradient in the dead space. It further permits air separation even during operation, thereby preventing settling of air bubbles entrained with the solution to be separated on the boundary surface of the packed column material, and penetration thereof into the column material packing. It is additionally also possible after running dry to refill with solution under sterile conditions.

We claim:

1. Apparatus for separating at least two biological substances in solution by adsorption, comprising a housing having a lower housing section which has at least one outlet, is packed with adsorption agent and comprises at its lower end a means which prevents emergence of adsorption agent particles therefrom, an upper housing section which is free from adsorption agent and into which at least one feed for the solution to be separated opens, an upper interior section (28) having a means effecting a partial constriction of the cross-section thereof in such a manner that said section (28) is divided into an upper and a lower subspace (34, 36) which via an opening (38) are in flow connection with each other as regards the solution to be separated, wherein the upper subspace (34) and the lower subspace (36) are also in flow connection as regards the adsorption agent particles, that the feed tube (40) for the solution to be separated is arranged in such a manner that the discharge thereof takes place into the lower subspace (36), and that the apparatus is a self contained unit in sterile form.

2. Apparatus according to claim 1, wherein the upper subspace (34) of the upper interior section (28) has a larger volume than the lower subspace (38).

3. Apparatus according to claim 1, wherein the dead space in the upper interior section (28) has a volume which is at least 5% of the packed lower interior section.

4. Apparatus according to any one of claim 1, wherein the means for partial cross-section constriction of the upper interior section (28) is a hollow annular element (32) connected all round with the interior walls (30) thereof and having a central opening (38).

5. Apparatus according to claim 4, wherein the annular element is formed as hollow annular distributing arrangement (32) and comprises at its lower side at least one gap like opening (42) continuous all round or a plurality of individual openings (42) which are provided with a means which prevents the entrance of column material particles and that the feed tube or feed tubes (40) for the solution to be separated open into the hollow ring (32).

6. Apparatus according to claim 5, wherein the entrance preventing means comprises at least one sieve.

7. Apparatus according to claim 5, wherein the openings (42) are arranged at the same distance from each other.

8. Apparatus according to claim 4, wherein the hollow annular distributing arrangement (32) comprises a cross-section tapering radially inwardly on its upper and/or lower side.

9. Apparatus according to claim 4, wherein at least the upper side of the distributing arrangement (32) has a smooth surface.

10. Apparatus according to claim 1, wherein the means for partial cross-section constriction is a constriction in the upper interior section (28), the upper and/or lower side of tapers in cross-section towards the centre, said side(s) having a smooth surface.

11. Apparatus according to claim 1, wherein the upper side of the housing (12) comprises a closable air outlet opening (20).

* * * * *